United States Patent [19]

Montagut

[11] 4,028,164

[45] June 7, 1977

[54] PROCESS AND APPARATUS FOR THE CONTINUOUS OBTAINMENT BY DISPLACEMENT OF CYLINDRICAL OR PRISMATIC HOLLOW BODIES PRODUCED WITH FIBRE-REINFORCED SYNTHETIC RESINS

[76] Inventor: José Salvador Montagut, Calvet 67, Barcelona, Spain

[22] Filed: May 30, 1975

[21] Appl. No.: 582,086

[30] Foreign Application Priority Data

June 5, 1974 Spain .................................. 427018
Jan. 21, 1975 Spain .................................. 433994

[52] U.S. Cl. .............................. 156/173; 156/175; 156/190; 156/429; 156/430; 156/431; 156/446; 156/457; 242/7.21; 242/7.22
[51] Int. Cl.² ........................................ B65H 81/00
[58] Field of Search .......... 156/173, 175, 188, 180, 156/187, 429, 195, 430, 431, 432, 391, 392, 64, 190, 378, 360, 446, 449, 450, 457; 242/7.22, 7.23, 7.21; 214/338

[56] References Cited

UNITED STATES PATENTS

| | | | |
|---|---|---|---|
| 2,812,007 | 11/1957 | Touchett et al. ................. | 156/187 |
| 3,033,729 | 5/1962 | Shobert ............................ | 156/175 |
| 3,306,797 | 2/1967 | Boggs .............................. | 156/432 |
| 3,328,224 | 6/1967 | Kennedy et al. ................. | 156/432 |
| 3,332,815 | 7/1967 | Havens ............................ | 156/429 |
| 3,616,063 | 10/1971 | Bradley ........................... | 156/429 |
| 3,700,519 | 10/1972 | Carter ............................. | 156/173 |
| 3,769,127 | 10/1973 | Goldsworthy et al. ........... | 156/175 |
| 3,874,970 | 4/1975 | Dunn ............................... | 156/429 |
| 3,886,338 | 5/1975 | Lokun et al. .................... | 156/429 |

Primary Examiner—Charles E. Van Horn
Assistant Examiner—Michael W. Ball
Attorney, Agent, or Firm—Woodhams, Blanchard and Flynn

[57] ABSTRACT

An improved process, and the apparatus for carrying out the process, of forming an elongated hollow body from fibre-reinforced synthetic resins. A plurality of resin impregnated support fibres are positioned over and extend longitudinally along a rotating mandrel, which support fibres are fed from a feed station having a plurality of spools thereon, which feed station rotates synchronously with the mandrel. The longitudinal support fibres form a fibrous substructure which rotates with the mandrel. A plurality of fibrous elements, also resin impregnated, are wrapped around the fibrous substructure to form the hollow body. The hollow body is gripped by a clamping device disposed at the discharge end of the rotating mandrel for pulling the hollow body and thereby displacing same longitudinally along the mandrel, which clamping structure simultaneously permits rotation of the hollow body with the mandrel.

9 Claims, 10 Drawing Figures

PROCESS AND APPARATUS FOR THE CONTINUOUS OBTAINMENT BY DISPLACEMENT OF CYLINDRICAL OR PRISMATIC HOLLOW BODIES PRODUCED WITH FIBRE-REINFORCED SYNTHETIC RESINS

FIELD OF THE INVENTION

This application relates to the continuous manufacture, by displacement, of hollow bodies of polymerisable synthetic resins reinforced with fibres, and in particular relates to an apparatus and a process for putting such manufacture into practice.

BACKGROUND OF THE INVENTION

It is known how to manufacture, by unit production means, cylindrical or prismatic hollow bodies of synthetic resin reinforced with fibres; in the processes followed in such manufacture a mould is coated with successive layers of synthetic resin and fibres, the mould being removed after the synthetic resin is polymerised. In some cases the mould can be used to produce a new unit, depending on whethr the mould is destroyed when the pattern is removed from it.

With the apparatus and the process according to the present invention, the hollow cylindrical or prismatic body manufactured is displaced, moving constantly over the mould, thereby avoiding the inconveniences inherent to removal of the pattern from the mould unit by unit. Also in accordance with this invention, the polymerisation of the obtained cylindrical or prismatic body begins practically when the wall thereof attains the predetermined thickness.

The process according to the invention is characterised by the operations of: placing a fibrous substructure previously impregnated with synthetic resin on a long mandrell which rotates continuously; moving the said fibrous substructure, by continuous traction, along the geometric axis of said mandrell; continuously rolling or winding around the substructure thus formed, other fibrous elements of like nature which have been previously impregnated with the same or another synthetic resin, said elements overlapping and/or superimposing one another to form a layer of the desired thickness; compressing the outer surface of said layer to eliminate possible hidden air bubbles; gauging and correcting where necessary the dimensions of the hollow body being manufactured; treating said hollow body to achieve polymerisation, curing and hardening of the resin, and cutting the continuous hollow body thus obtained into predetermined lengths.

The process of this invention is further characterised in that said fibrous substructure, which circumferentially can totally or partially cover the outer surface of the chuck, can be constituted by elements of a continuous nature such as yarn, fabric, gauze, etc.

Another object of this invention is an apparatus suitable for putting into practice the manufacturing method just described, which apparatus consists essentially of a mechanically driven rotary disc which can rotate in one direction or another at variable speed, provided on at least one of its sides with means for feeding fibrous elements of continuous nature to a long mandrel forming a part with said disc and placed centrally with respect thereto, its geometric axis being perpendicular to the plane of the cited disc, the periphery of the latter being provided with a plurality of guide means designed to conduct said continuous fibrous elements from their means of supply, so that when the disc rotates they can submerge in a tank containing a synthetic resin, said tank being located directly beneath the disc, the mandrel having a cross-sectional shape according to the cross-sectional shape of the end product desired; means for feeding other continuous fibrous elements, previously impregnated with synthetic resin, to the said rotary mandrel in a zone in which the mandrel is already covered by said fibrous substructure, the purpose of these means being to roll or wind said other continuous fibrous elements, with superimposition or overlapping, to achieve a layer of predetermined thickness on the mentioned fibrous substructure; means fo exerting a compressing force on the outer surface of the hollow body being manufactured to thus eliminate hidden air bubbles as the said body advances over the cited chuck; means for gauging the dimensions of the hollow body as it advances during manufacture and still remains on said mandrel; means for achieving the polymerisation, curing and hardening of the resin; means for subjecting the forward end of said fibrous substructure first realised on the mandrel to traction, to start the displacement of the substructure along the length of the mandrel, said means of traction being applied continuously during manufacture and with light pressure upon the outer surface of the finished hollow body to automatically keep it moving along the length of the cited mandrel, and finally cutting means to function at predetermined moments to thus obtain predesignated lengths of the finished ocntinuous hollow body.

These and other objects of the present invention are explained more particularly in the following detailed description.

DETAILED DESCRIPTION

Figure 1A:
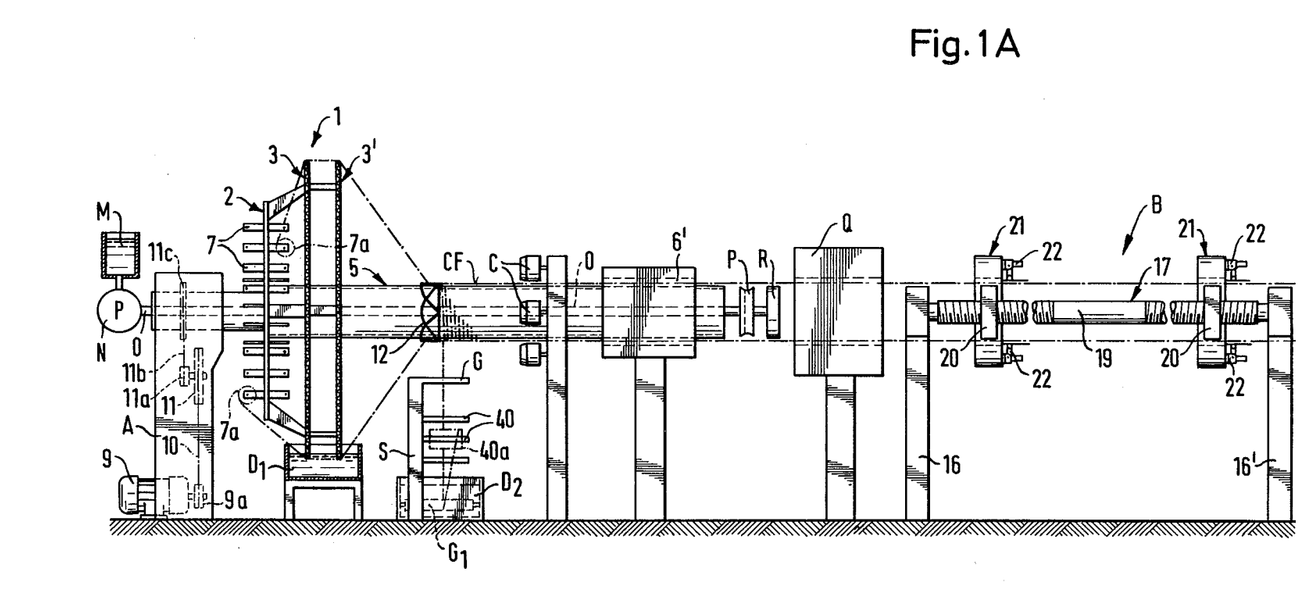
FIG. 1A is a general plan of the relative arrangement of the different elements constituting the apparatus according to the invention.

In FIG. 1A, A is the frame which supports the rotary disc 2, which on one or on both of its sides carries support brackets 7 for spools of continuous fibres, and in addition has some ring-shaped members 3, 3'. In the lower portion, beneath these ring-shaped members 3, 3', a first tank D for synthetic resin is provided. Forming part with the central portion of the disc 2 there is a tubular mandrel 5 the exterior surface of which is provided with fibre guide means 12 and close to which, in the first third of its length, there is a stand S for supporting, for rotation on shafts 40, other spools of continuous fibres which are guided toward the mandrel 5 by a guide G. These last-mentioned continuous fibres are impregnated, before being applied to the mandrel 5, in the synthetic resin contained in another tank D.

In the second third of the length of the mandrel 5, there is provided a gauging device shown in the diagram as C, and in continuation thereof and always toward the end where the finished product exits there are heating means 6' for polymerising and hardening the synthetic resin (there can also exist, or alternatively, other interior heating means not represented in this FIG. 1A). In continuation of the mandrel 5, provision is made for a traction mechanism for drawing the finished product, constituted by two spindles 17, 18 (of which only that marked 17 is shown) which are rotatably supported in respective end struts 16, 16', and between these two spindles and in a manner which will be explained hereinafter, two drawing plates 21, 21' can move, which plates are formed by two parts, one of which, a fixed part, supports in concentric rotation therewith a second movable part which contains, on one of its faces, a plurality of gripping jaws 22 which are applied to the outer surface of the finished product. Each of the aforementioned spindles 17, 18 has a counter-clockwise screw thread in each of fits two halves, a non-threaded zone 19 remaining in the central portion.

Figure 1B:
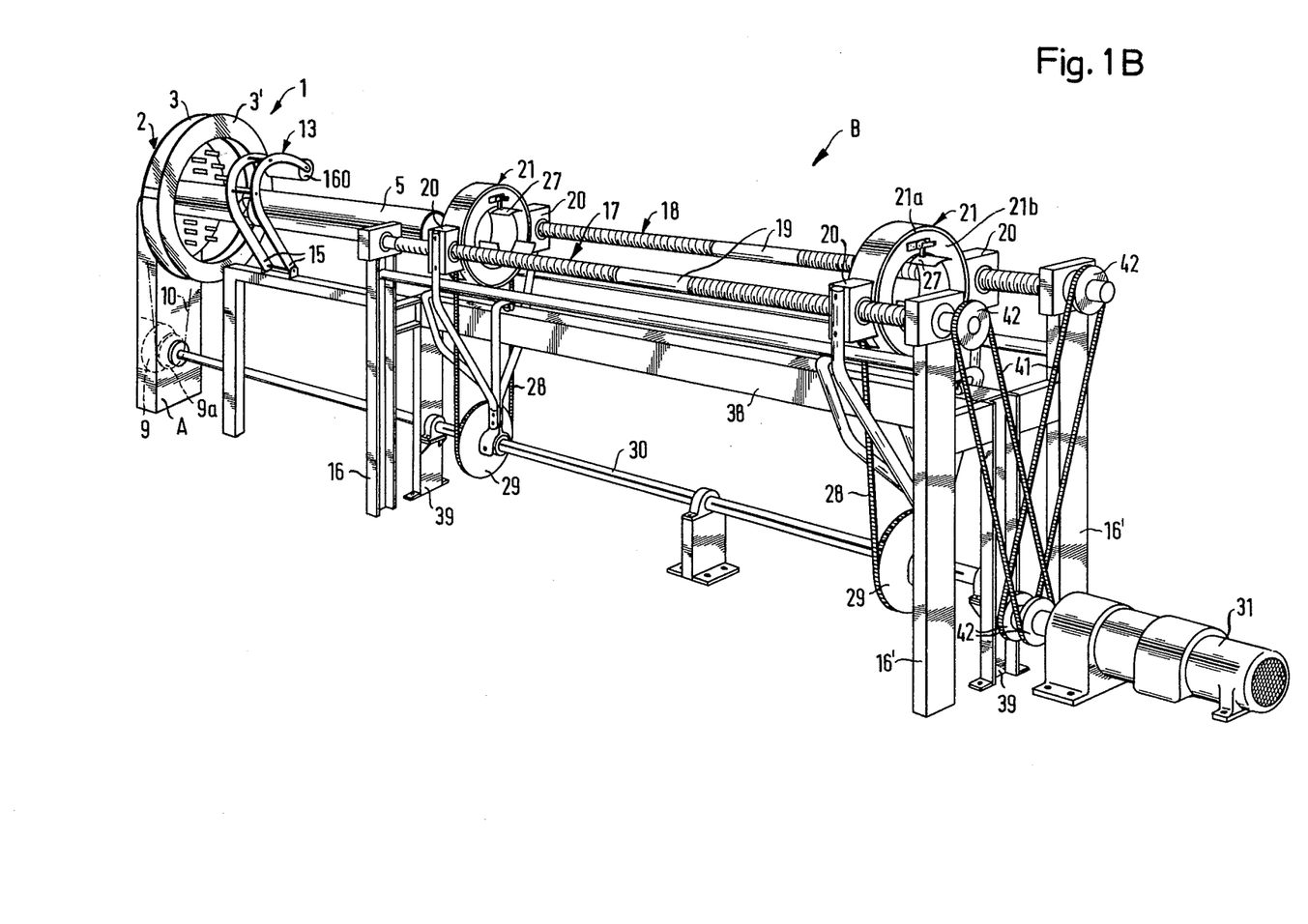
FIG. 1B represents a view in perspective of the apparatus of the invention in a practical realisation, seen from the end from which the finished product exits.

Referring now to FIGS. 1B-3 of the drawings, these represent with more detail an apparatus according to the invention, constituted by a rotary disc which is rotary-supported in a frame A, the said disc unit being marked 1 in FIG. 1B and being constituted by a first support disc 2 (see FIGS. 2 and 3) of large diameter and a pair of ring-shaped members 3, 3' arranged parallel and spaced from one another and with respect to the disc 2, the interior diameter of said ring-shaped members 3, 3' being approximately equal to the diameter of the disc 2, member 3 being supported in fixed relation with respect to disc 2 and member 3' being supported in a fixed manner with respect to member 3, by means of respective support parts 4, 4'. Protruding centrally from this disc 1 are moulding mandrel means constituted by a tubular member 5, made solid at one of its ends to the disc 2 and supported thereby by an overarm bracket. The interior of this mandrel 5 is provided with heating means 6 of any adequate type, for example, an infrared heating element or the like, for a purpose which will be described later.

Figure 2:
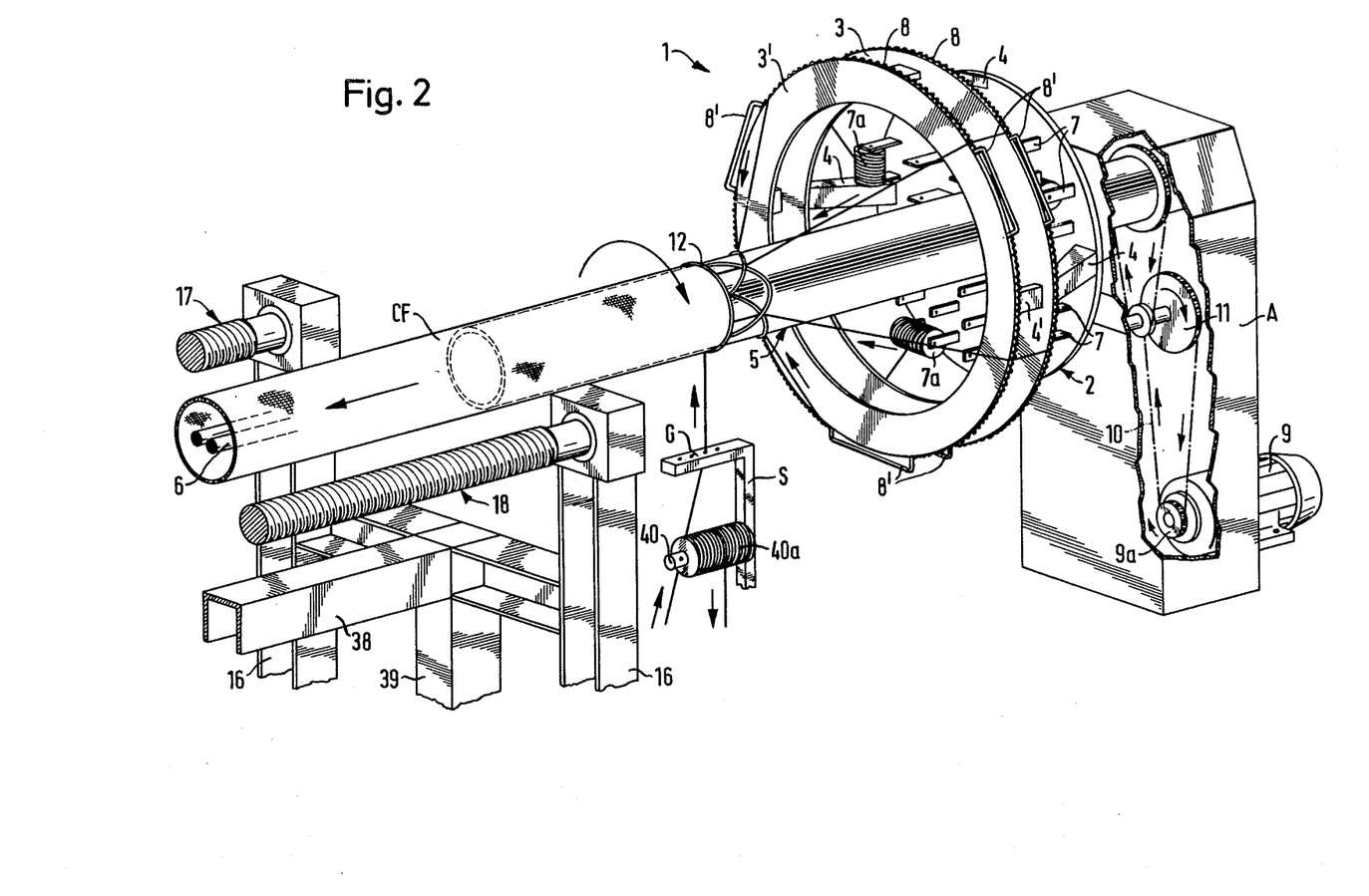
FIG. 2 is a large-scale view of the rotary disc and the moulding mandrel, also illustrating the means for driving said rotary disc.
Figure 3:
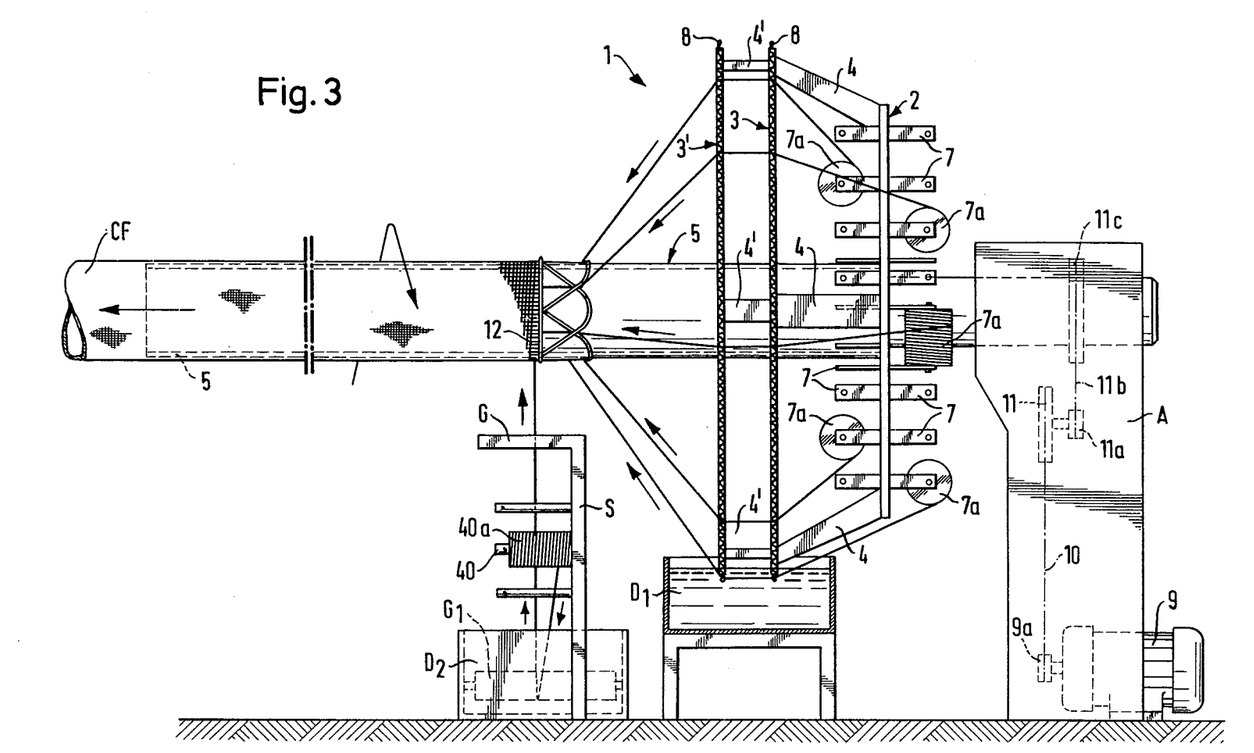
FIG. 3 is a view similar to that of FIG. 2, but seen from one side of the apparatus, which illustrates the assembly of the rotary disc.

The disc 2 bears, on at least one of its sides (and on both in the illustrated realisation), a plurality of pairs of support brackets 7, each of which pairs holds a spool containing a roll 7 of continuous fibrous element, while the periphery of the ring-shaped members 3, 3' bears multiple guide means 8, 8' designed to lead said continuous fibrous elements from the side of the disc 2 of said ring-shaped members 3, 3' toward the outer side of said members, to the mandrel 5.

This entire rotary disc unit 1 just described, including the mandrel 5, is rotatably supported in the frame A and is turned (see FIG. 3) by an electric motor 9 the output shaft of which has a small-diameter pulley 9a in whose sheave rests a transmission belt 10 which drives another pulley 11, which in turn transmits the drive by appropriate means to the rotary disc unit 1. Means are provided (not shown) for permitting variation in the speed of disc 1, and to permit inversion of its direction of rotation according to needs.

Also, the tank D is provided (see FIG. 3) directly below the periphery of the ring-shaped members 3, 3' to contain a synthetic resin, said tank being situated so that when the apparatus is in operation the rotating periphery of said members 3, 3' and, consequently, the guide means 8 of the continuous fibre, are submerged, specifically the lower arc of their curved trajectory of rotation, in the synthetic resin contained in the cited tank, the fibre therefore emerging toward the said chuck already impregnated with synthetic resin.

On its part, the tubular mandrel 5 can have a cross-sectional shape in accordance with the cross-sectional shape desired for the final finished product.

Around this mandrel 5 forming part with the disc 1 are provided means 12 for guiding the continuous fibre (see FIGS. 2-4) constituted by curved wires placed around the mandrel 5, approximately halfway along its length and fastened thereto, the wires 12 crossing each other in such a manner as to define guide points for the fibre and being grouped very close to the outer surface of the mandrel 5, so that perfect application is achieved of said continuous fibres fed axially upon the mandrel 5.

Mounted alongside the mandrel 5 is a pressure member 13 formed by a double rocker arm 14, generally of arched shape and pivotally jointed at its lower end 15 to a lateral beam of the frame of the apparatus, the opposite end of which pressure member bears a pressure roller 160 mounted to freely turn by its ends in the two identical elements which constitute the double arm 14, the geometric axis of said roller 160 remaining parallel, in all the rocking positions of the double arm 14, to the geometric axis of the mandrel 5. This roller 160, when the apparatus is in operation, is applied by virtue of its own weight to the surface of the mandrel 5, or to the fibrous substructure which is directly formed thereon.

Figure 4:
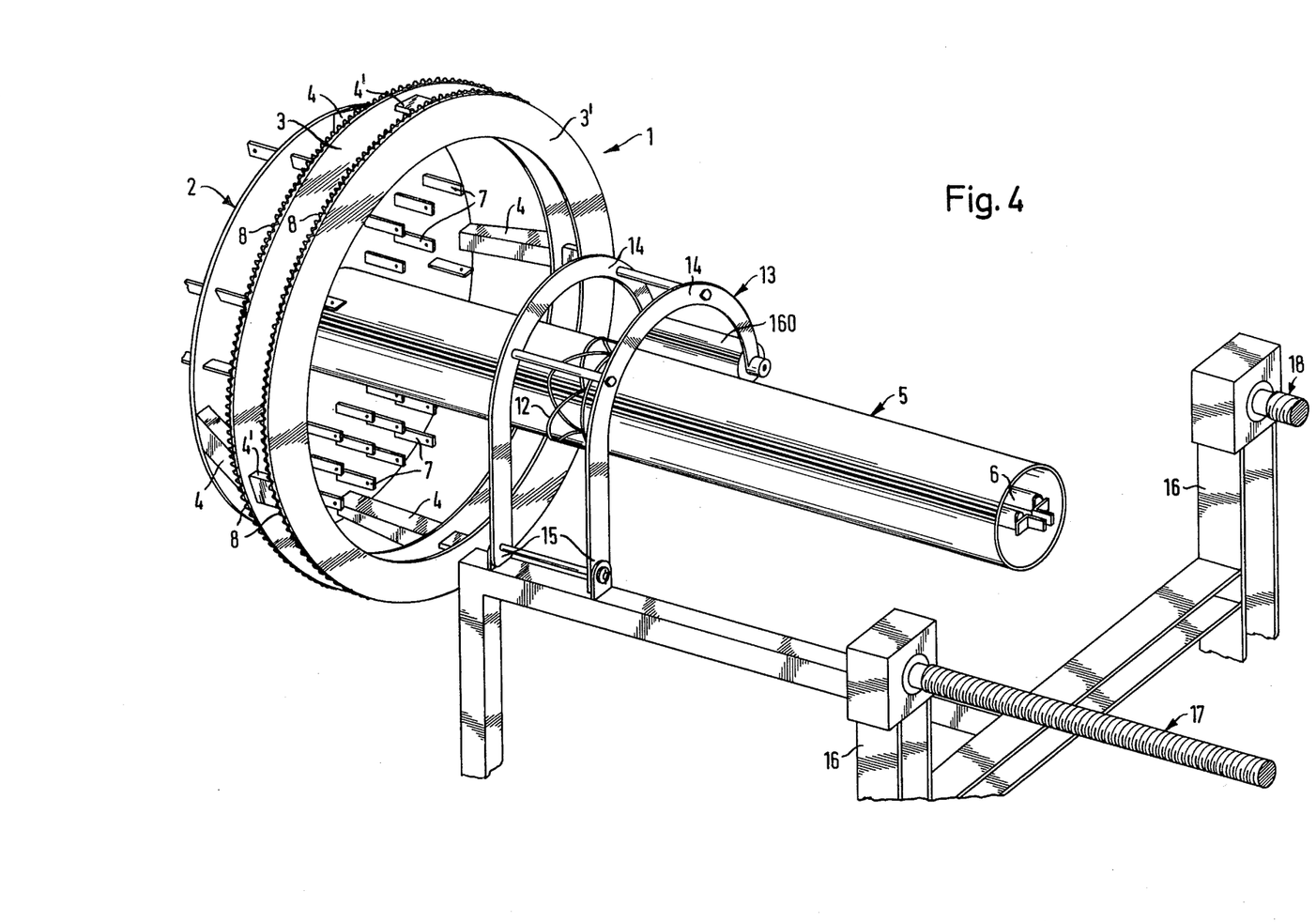
FIG. 4 is an enlarged view in perspective of the mandrel part of the apparatus according to the invention.

In FIG. 4, it is possible to see in detail the relative position of the mandrel 5, the heating element 6 in its interior and the guide means 12 and the pressure roller 160 with its rocker arm 14 on its exterior.

Figure 5:
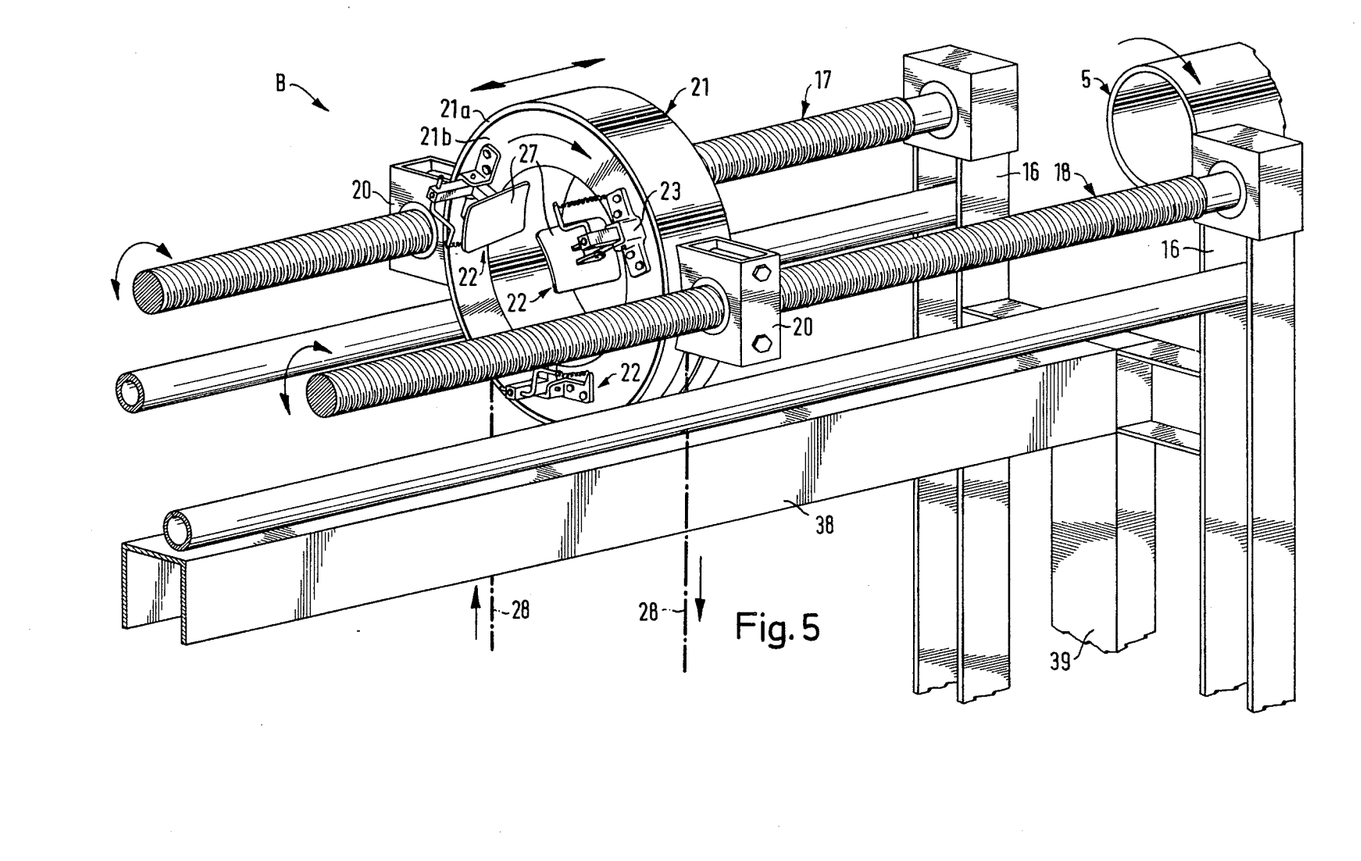
FIG. 5 is another view in perspective which illustrates part of the traction mechanism for removing the manufactured body, and represents the part of said mechanism closest to the mandrel of the apparatus.

Past the chuck 5 (see FIG. 1A and 1B) there is a traction mechanism for removing the manufactured product, designated as a whole with the identifying letter B. This mechanism consists of a bed-frame formed by two spaced pairs of braces 16 and 16' and between which are arranged long spindles 17, 18, each of which is screw-threaded in opposite directions from its ends to just short of half of its total length, a portion 19 in the central zone of said spindles remaining unthreaded (see FIGS. 1A and 5). Mounted in the threaded portions of each spindle are movable members 20 constituted essentially by screw-nuts which are unable to turn, so that they can be moved longitudinally the length of the corresponding threaded portion of the spindle in one direction or the other, according to the direction of rotation of said spindle. Mounted between each two paired movable members 20 there is a ring-shaped drawing plate unit 21 formed by two parts, one fixed and one movable, the first of which forms part of both movable members 20 and the second of which has mounted, on one of its sides, a series of three gripping jaw units 22 (see FIG. 5) for application to the outer surface of the hollow product with certain pressure, to remove it by traction from the chuck as it proceeds to be manufactured thereon.

The jaw units 22 are identical to one another, and thus only one will be described in detail, corresponding reference being made to FIG. 6 of the drawings.

These jaw units 22 move in opposite directions due to their being engaged with the opposing threaded portions of the spindle.

Figure 6:
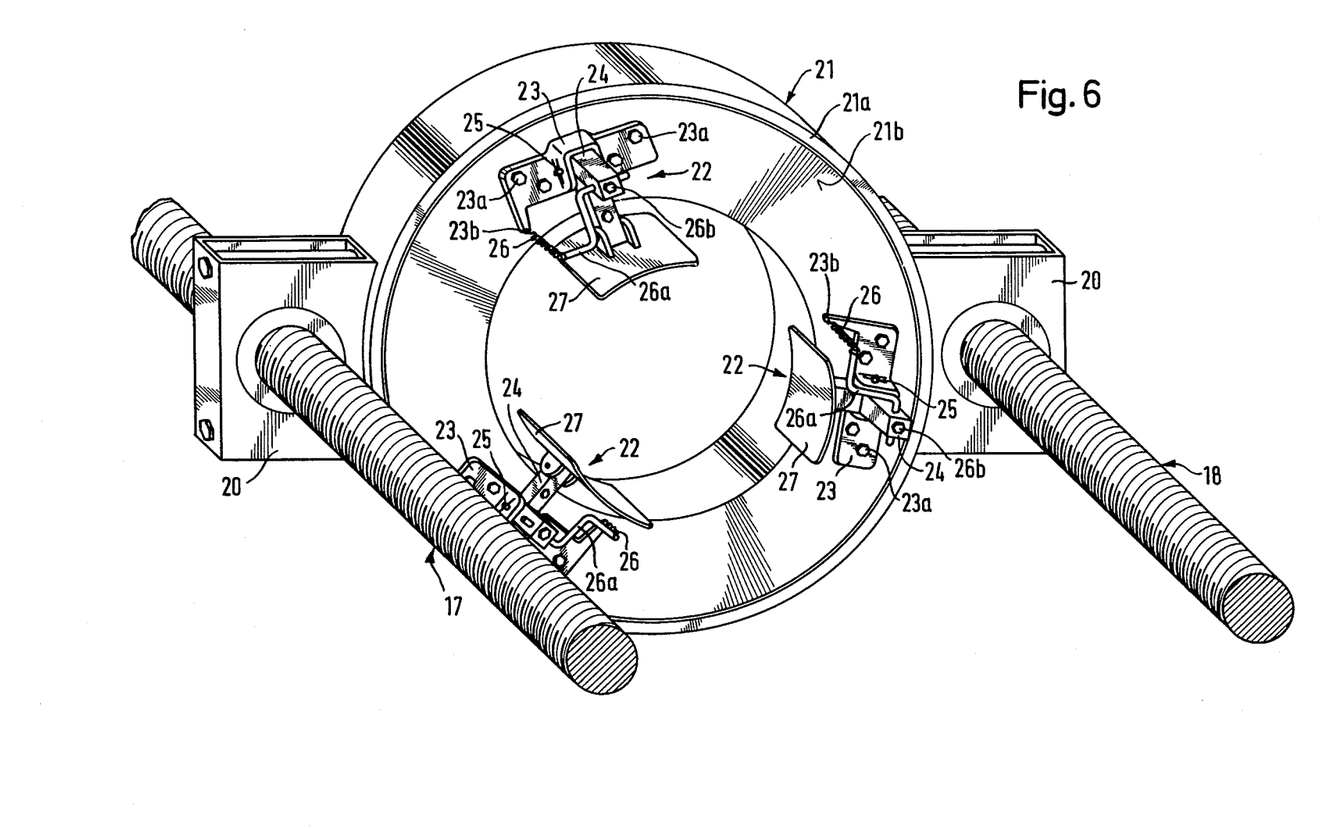
FIG. 6 is a detailed view of one of the jaw-face plates for drawing the manufactured body which forms part of the mechanism of FIG. 5, and in which the arrangement of said jaws in the cited plate is illustrated.

In FIG. 6, the jaw units 22 of each ring-shaped plate until 21 are arranged on the side of said plate unit opposite from the chuck with a circumferential separation between them of 120°, although naturally this is nothing more than a presently preferred arrangement, and each is constituted by a bracket 23 fastened as by screws 23a to the face of the rotary part 21a of the ring-shaped plate unit 21, which bracket supports in rotation by means of a pin 25 a short-armed toggle lever 24, one of the arms of the toggle lever 24 lying parallel to the geometric axis of the apparatus (or the trajectory of formation of the product) and the other, also short, arm of said toggle lever being directed radially inward with respect to the ring-shaped plate unit 21.

The first arm of the toggle lever 24 has a Z-arm or rod 26a, one end of which is affixed thereto, for example by means of a screw 26a, while the free end receives one end of a helical traction spring 26 whose other end is coupled to one point of the bracket 23, the arrangement being such that in the non-operating position of each jaw unit 22, the spring 26 acts upon the toggle lever 24 to weigh down its arm directed radially toward the ring-shaped plate 21b. Mounted on this radially directed arm is a shoe 27 applicable to the manufactured hollow body, said shoe being formed by a concave plate the convex face of which is pivotally jointed to the end of said radial arm.

Figure 7:
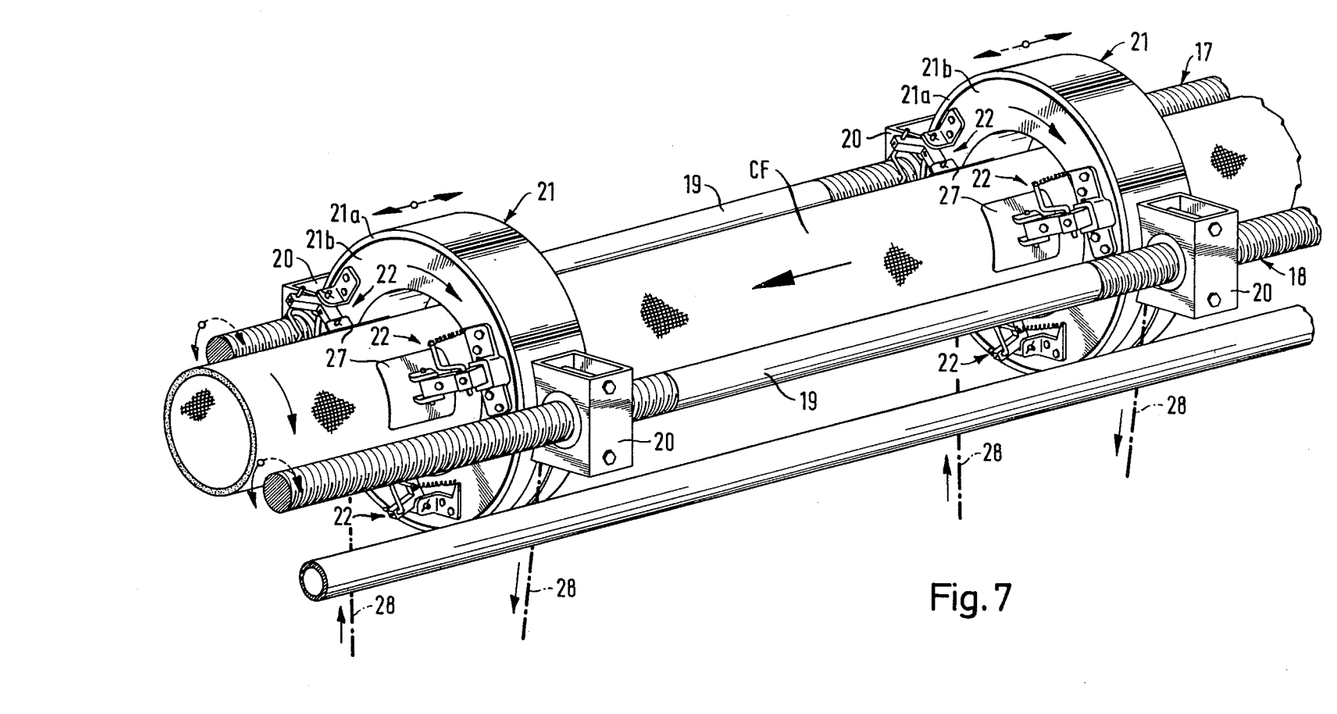
FIG. 7 and 8 represent views in perspective and in detail of the operation of the jaw-face during functioning of the apparatus of the invention.
Figure 8:
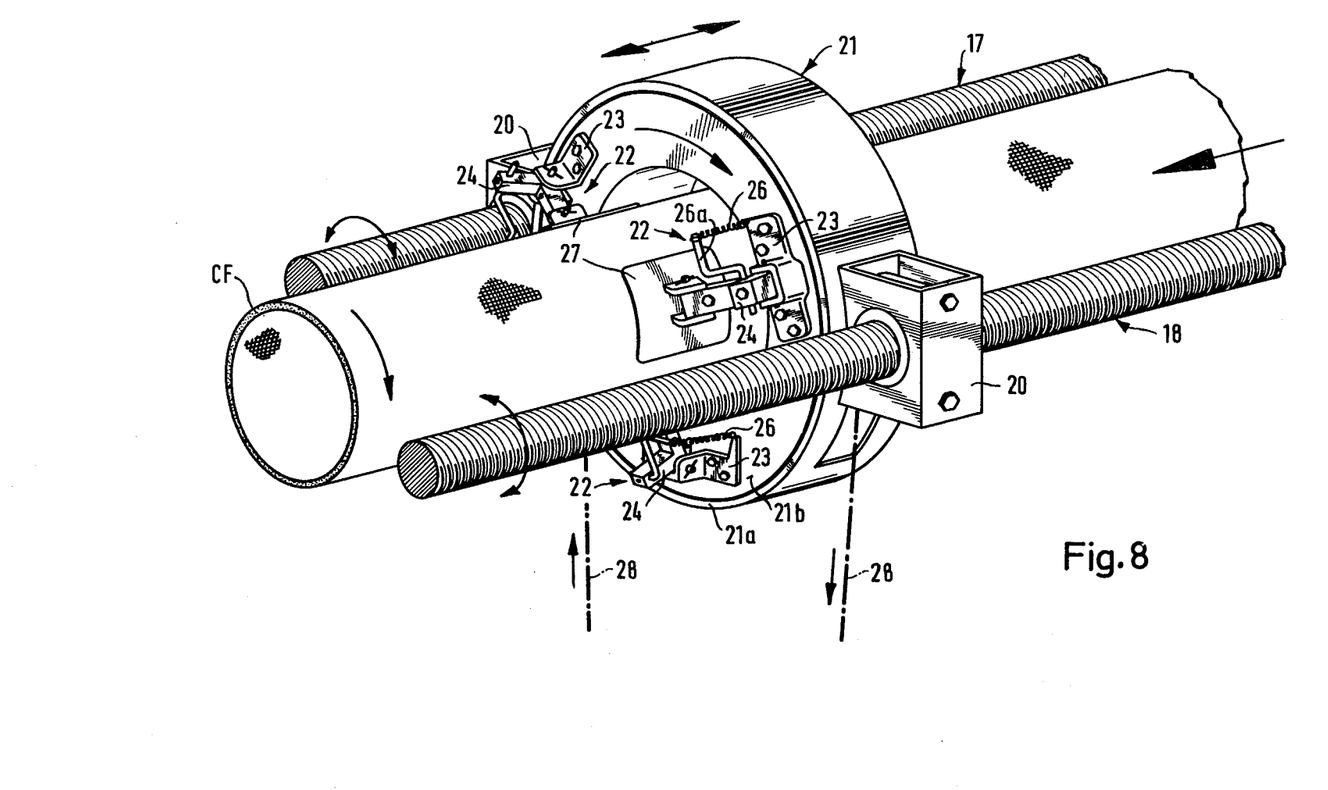

The result of this arrangement is that when the jaw units 22 of the ring-shaped plate 21b are not in operation, they tend to move toward the ring-shaped plate 21b by the action of the springs 26, and since the diameter of the virtual cylinder delimited by the three shoes 27 of a same plate is somewhat less than the transversal dimension of the manufactured product CF, the shoes are applied with certain pressure to the latter during function of the apparatus (see FIGS. 7 and 8).

As has been said, each ring-shaped plate unit 21 has two parts, the first of which, a fixed part 21a, is solid with the transporting members 20, while the second part 21a, which rotates concentrically with the first, is mounted with the jaw units 22.

This second rotary part 21a of each plate unit 21 of is rotated by a chain 28 (see FIG. 9) the lower portion of which engages in a chain sheave 29 slidably an one end of a horizontal shaft 30 rotatably supported at at least three points under the bed-frame of the drawing mechanism being described, but so that it can move the length of said shaft in one and the other direction, the said shaft 30 being turned by means of the motor 9 so that it is possible to have the rotary part 21a of each plate unit 21 turn at the same speed as the rotary disc 2, the mandrel 5 and the hollow body in manufacture.

Figure 9:
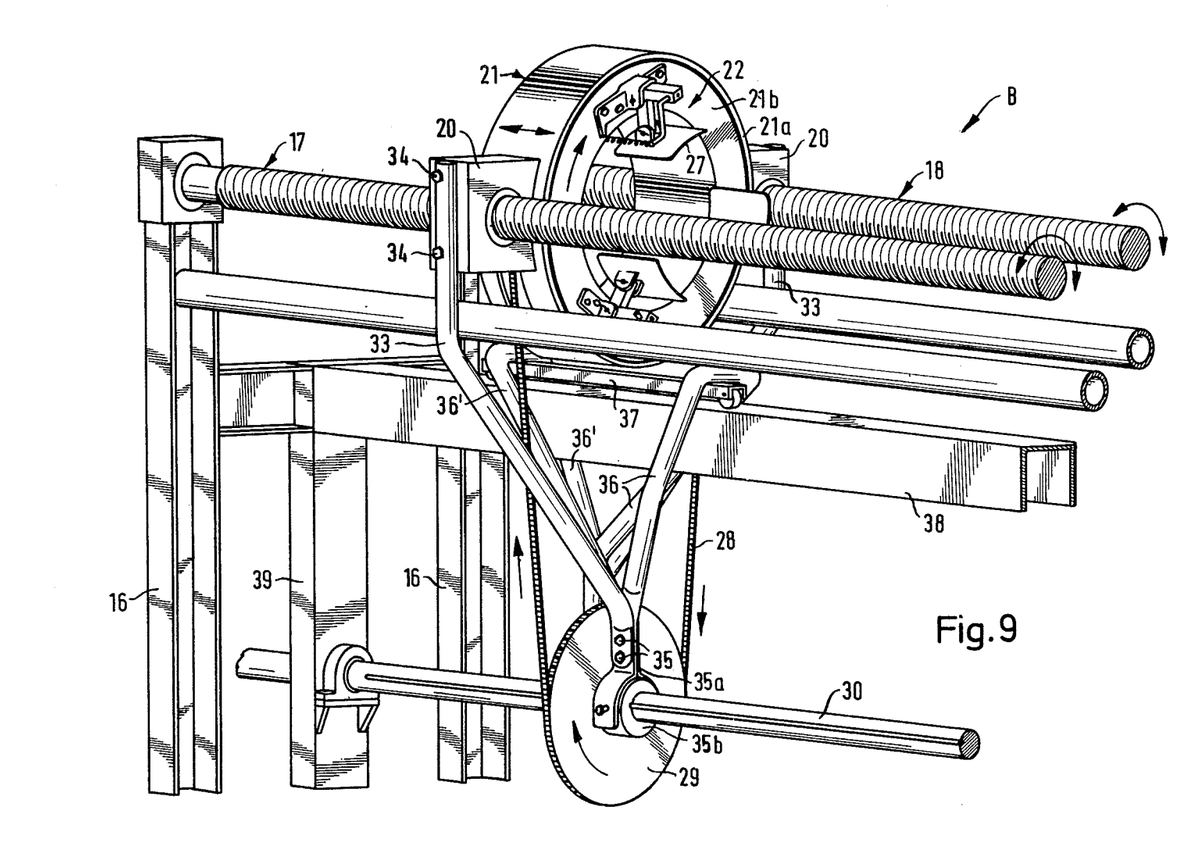
FIG. 9 is a representation of the driving system of one of the jaw-face plates of the mechanism for removing the finished hollow body.

Mounted on the shaft 30 are two of these chain sheaves 29, one under each movable ring-shaped plate unit 21 and designed to transmit the rotation of said shaft to the rotary part of each of the mentioned units. Furthermore, there is a linkage system between each ring-shaped unit 21 and the central bushing which slidably supports the chain sheave 20 on the shaft 30, said linkage system being constituted by two first rods 33 of appropriate shape, one on each side of the plate unit 21 and fastened by screws, for example, to the movable member 20, at 34, at its upper end and to a support bracket of the chain sheave bushing, as in 35, at its lower end. In addition, provision is made of two other pairs of levers 36, 36 and 36', 36', which at their lower ends are also joined to the support bracket of the chain sheave bushing, and which at their upper ends are connected to the ends of a truck 37 mounted on wheels to run along the upper side of a beam 38 arranged centrally in the frame of the drawing mechanism, which beams extend the full length of the bed-frame and parallel to the spindles 17, 18 but at less height than these, between the end braces 39.

This truck 37 and connection levers 36, 36 serves to facilitate movement of the sheave 29 along the shaft 30, the latter simultaneously making the former turn inasmuch as said sheave is hung from the beam 38, thus preventing the weight of the sheave from impeding its smooth movement along the cited shaft.

The motor 31 serves to drive the spindles 17 and 18 by means of, for example, chain and sprocket transmission (see FIg. 1B). The function of this mechanism is to vary the turning speed of the spindles 17, 18, and thereby vary the displacement speed of the plate unit 21 to either increase or decrease the drawing speed of the hollow body in manufacture.

Finally, and in the part of the drawing mechanism from which the finished product exits, means for cutting the product are provided which can be of any known type and which do not constitute a fundamental part of this invention, and thus are neither described or illustrated in this specification.

Returning now to FIG. 1A of the drawings, it can be seen therefrom that approximately halfway along the length of the mandrel 5, and in any case between the fibre guide means 12 and the gauging device C, other means of feeding continuous fibrous elements are provided, constituted in this diagram by stand S having supports 40 for holding various rolls 40a of said fibrous elements and a guide G for supplying these fibrous elements to the mandrel 5, at a point thereon where the base fibrous substructure, as fed from rolls 7a, is present.

These other means of supply are designed to furnish, for example, fibrous elements in band, tape, filament form, etc., with overlapping or superimposition of said elements or in application without any overlapping whatever. Before being fed to the guide G, these elements are impregnated with the resin contained in the second tank $D_2$ located beneath it, it being possible for the resin in this second tank to be of the same or a different type of that in the first tank $D_1$ The mentioned guide G can be provided with means capable of displacing each of the fibres fed through it, so that each is applied to the mandrel 5 according to variable designs or patterns, with the result that a layer of interwoven fibres is obtained in the final product.

Means of perception and measurement C are also provided around the mandrel 5, diagrammatically represented in FIG. 1A by rollers C mounted in a vertical support around the mandrel, in a manner so that they are rollingly applied to the exterior surface of the finished body CF and mounted so that they are affected by variations in the exterior dimension of the cited hollow body with respect to a predetermined value for such dimension, the perception of said variations being transmitted, by appropriate means, either to a corrector device of known type and which can be incorporated into the perception means themselves, designed to correct such detected variations while the material is still in a pasty state, or to a device designed to vary the feed rate of fibres to the mandrel to thus increase or decrease the thickness of the wall of the hollow body being manufactured.

In another realisation of the apparatus according to the invention, means (not shown) are provided in the rotary disc 2, for feeding a material designed to form a base coating around the mandrel, prior to application thereto of the continuous fibrous elements which are to constitute the fibrous substructure, the purpose of said coating being to facilitate the displacement, in axial direction, of said fibrous substructure with respect to the mandrel.

The base coating in question can finally remain incorporated in the finished hollow body or can be totally or partially destroyed, and to achieve it use can be made of band or filament material in the form of roving, weaves, mesh, etc.; for example, said material can be a strip of paper, of polyethylene or a fabric of natural or artificial fibres, and even can be a film of a pulverulent or lubricant product.

Use can be made, for example, of commercially available fibre glass in any of its different forms and quantities, or any other natural, artificial or synthetic fibre which, like the resin and the possible fillers used, will respond to the characteristics which the product it is desired to obtain must have.

OPERATION

The function of the apparatus according to the invention will be described as follows, with reference to the figures of the drawings.

First, manual application is made to the mandrel 5 of the base coating designed to facilitate movement of the fibrous substructure formed form rolls 7a of fibre mounted in the brackets 7 of the disc 2 of the rotary disc, the fibres from said rolls then being placed, also manually, axially over the mandrel. In case the base coating were not necessary, the fibres of the substructure are applied directly onto the mandrel.

Once this is done the machine is started, the disc 1 with the associated mandrel 5 and the jaw plate units 21 thereupon rotating at the same speed, the last-mentioned units 21 at the same time moving in a reciprocating motion along the respective threaded sectors of the spindles 17, 18, the shoes 27 moving toward the geometric axis of the plates during the displacement of each plate unit 21 in a direction contrary to the mandrel and said jaws separating from the geometric axis of said plates 21 when the latter move toward said mandrel.

In this manner, said substructure fibres fed axially upon the mandrel 5 from spools 7a placed in pairs of brackets 7 on the through the guide means 8, 8' on the periphery of the ring-shaped members 3, 3', are applied axially to the exterior surface of the mandrel 5 (or upon the base coating, if this exists) by means of the guide 12, and over them are spirally wound the resin-impregnated fibrous elements supplied from the feed means 40 and the guide G, these elements being applied with or without total or partial overlapping thereof.

Once the forward end of this body so manufactured is drawn manually through the means for eliminating hidden air, the gauging means C and the resin polymerisation means G, to the jaw plate units 21, the shoes 27 of the latter are applied to the exterior surface of the recently formed body CF and the apparatus commences to function automatically.

In this manner the fibre fed from the disc 2, once impregnated with resin in the first tank $D_1$, are placed axially over the mandrel in a continuous manner, and over them accumulate one or more layers of fibres fed from rolls 40a (also resin-impregnated) until the desired thickness of the hollow body wall is obtained, said wall thickness being controlled by means of the gauger C and the resin being cured commencing from placement over the mandrel 5 of the impregnated fibres due to the heating element 6 arranged inside the mandrel to accelerate the polymerisation of the resin, and/or due to the polymerisation means 6' situated outside the mandrel, so that subsequently the continuous hollow body CF thus manufactured is gripped by the jaw plate units 21, alternatively, to be drawn in substantially continuous movement over the mandrel 5 to some appropriate cutting means of known type, which are not described or illustrated in this specification inasmuch as they do not form an integral part of the invention, and by means of which the continuous body is cut into the desired lengths.

Returning now to FIG. 1A of the drawings, also represented therein is a tank M (appearing at the left of the figure), designed to hold the synthetic resin which is to be applied as the interior coating or lining of the manufactured hollow product. This tank M feeds the resin it contains to a proportioning pump N which propels said resin through a heat-insulated duct O which extends the full length and inside of the moulding mendrel 5, ending, outside the mendrel, at a distributor head P placed between the exit end of said moulding mandrel 5 an the mechanism for drawing the manufactured hollow body represented in the right half of the drawing. Farther past this distributor head P provision can be made for interior gauging elements R designed to carry out the same function as the exterior gaugers C, that is, to uniformly distribute the resin applied by P over the entire inner surface of the hollow body being manufactured.

Likewise provision is made for heating means Q, situated both inside and outside the manufactured product, the purpose of which is to accelerate the polymerisation and curing of the chamber of resin applied by the head P to the inner surface of the hollow body being manufactured.

Of course, both the shape and the dimensions of the resin distributor head P must be in consonance with the interior dimensions of the manufactured hollow body, the said distributor head thus being in close proximity to the interior surface of said hollow body to thus facilitate application of the resin to its inner surface.

Application of the layer of synthetic resin to the interior of the manufactured hollow body will be made in accordance with the needs of manufacture, it being possible to impregnate the inner surface of said body as well from the first moment of such manufacture as in a continuous manner during the entire manufacture, or even only during predetermined periods of time, according to necessity.

While the foregoing has shown and described a presently preferred realisation of the object of this application, experts in the art will realise that it is possible to make modifications and variations thereof as to form and details without departing from the spirit or scope of the invention as it is defined in the attached claims.

What is claimed is:

1. Improvements in or relating to a process for the continuous manufacture by displacement of an elongated hollow body with fibre-reinforced synthetic resins, obtained by the continuous winding of fibrous elements impregnated with synthetic resin over an elongated mandrel previously covered with resin impregnated support fibres placed parallel to the longitudinal axis of said mandrel, comprising the steps of:

a. rotating the mandrel about an axis parallel to the longitudinally extending direction thereof;
b. providing a plurality of feed stations for supplying said support fibres;
c. rotating said plurality of feed stations about said axis in unison with said mandrel and simultaneously feeding said support fibres from said feed stations to said rotating mandrel;
d. impregnating said support fibres with a liquid resin after they leave said feed stations but before they contact the mandrel;
e. placing said resin impregnated support fibres longitudinally over the continuously rotating mandrel as it rotates in unison with said plurality of feed stations to thus form a fibrous substructure which rotates with the mandrel;
f. displacing the rotating fibrous substructure thus obtained longitudinally along the length of said mandrel in a direction away from the feed stations by pulling on the substructure while preventing relative rotary movement between said substructure and said mandrel;
g. winding a plurality of continuous resin impregnated fibrous elements around said rotating fibrous substructure as it is supported on and being displaced longitudinally along the mandrel to form an elongated hollow body, whereby the fibrous elements extend spirally around the hollow body to form a layer of given thickness;
h. treating the wall of the holow body thus obtained to eliminate trapped air;
f. controlling and correcting defects in the wall of the hollow body;
i. moving said hollow body past a first heating station to at least partially cure and harden the resin;
j. providing a resin distributor head at a location which is spaced downstream from both the heating station and the discharge end of the mandrel;
k. applying a layer of resin of desired thickness to the interior surface of the hollow body by means of said distributor head as said hollow body is moved therepast;
l. moving said hollow body past a second heating station which is located downstream of said distributor head to cure and harden the inner layer of resin; and
m. severing said hollow body into sections of desired length.

2. Improvements in or relating to an apparatus for the continuous manufacture by displacement of a hollow body with fibre-reinforced synthetic resins, comprising: frame means; an elongated mandrel rotatably mounted adjacent one end thereof on said frame means so that said mandrel projects outwardly from said means in a cantilever manner, said mandrel being supported for rotation about a longitudinally extending axis;

first drive means operatively interconnected to said mandrel for rotating same;

a spool-frame fixedly joined concentrically to said mandrel for rotation therewith, said spool-frame being positioned adjacent said one end of said mandrel and having a plurality of spools supported thereon for feeding a plurality of longitudinal support fibres axially along the periphery of said mandrel to thereby form a fibrous substructure which rotates in unison with said mandrel;

guiding means rotatable with said spool-frame and disposed for guidably deflecting the support fibres after they are removed from the spools but prior to the fibres being positioned adjacent the periphery of said mandrel;

tank means disposed adjacent said guiding means and containing therein a synthetic resin so that said guiding means and the support fibres guided thereon are submerged in said tank means during rotation of said spool-frame and mandrel;

means for winding one or more fibrous elements impregnated with synthetic resin around the rotating fibrous substructure which is supported on and extends longitudinally of the rotating mandrel, said last-mentioned means including stationary support means spaced from said mandrel, said fibrous element body guided from said stationary support means to said mandrel so as to be wound around the fibrous substructure thereon, whereby said fibrous substructure and said fibrous element form a hollow body;

means for eliminating air trapped in the wall of the hollow body;

pulling means for engaging the hollow body and pulling same in its longitudinal direction for displacing said hollow body relative to said mandrel in the longitudinal direction of said mandrel away from said spool-frame, said pulling means including first and second clamping units which are spaced apart from one another in the longitudinal direction of the mandrel, each of said clamping units having movable clamping means adapted for engagement with the hollow body;

second drive means drivingly interconnected to each of said clamping units for rotating said clamping units synchronously with said mandrel about the rotational axis thereof;

third drive means drivingly interconnected to each of said clamping units for causing linear reciprocation thereof in a direction substantially parallel to said rotational axis;

each clamping unit including a first part which is mounted for linear reciprocating movement parallel to said longitudinal direction and is restrained from rotation, said third drive means being drivingly interconnected to said first part; and each said clamping unit also including a second part rotatably supported on said first part for rotation about said rotational axis, said second drive means being drivingly interconnected to said second part, and said clamping means being mounted on said second part and disposed for engagement with said hollow body to thereby rotate simultaneously with said hollow body in response to mandrel rotation as said hollow body is being displaced longitudinally of said mandrel.

3. An apparatus according to claim 2, wherein said third drive means causes said first and second clamping units to be simultaneously linearly displaced in opposite directions, said clamping means as associated with each unit being automatically engageble with the hollow body when the respective clamping unit is being linearly displaced away from the mandrel, said clamping means being disengaged from the hollow body when the respective clamping unit is being linearly displaced toward the mandrel, whereby the first and second clamping units alternately engage and pull the hollow body as they are simultaneously reciprocated back and forth in opposite directions.

4. An apparatus according to claim 3, wherein said second part comprises a ring which surrounds said hollow body and has said clamping means supported thereon, said clamping means including a plurality of clamp movably supported on said ring and spaced circumferentially therearound so as to clampingly engage said hollow body at a plurality of circumferentially spaced locations.

5. An apparatus according to claim 2, including a guide structure fixed to said mandrel closely adjacent the periphery thereof and disposed downstream of said guiding means for deflecting the support fibres which are fed to said mandrel so that the support fibres extend axially of said mandrel and are positioned closely adjacent the periphery thereof.

6. An apparatus according to claim 2, including heating means disposed adjacent the mandrel for curing and hardening the synthetic resin.

7. An apparatus according to claim 6, wherein said heating means is disposed in the interior of said mandrel adjacent the discharge end thereof.

8. An apparatus according to claim 2, including resin feed-head means for applying a layer of resin to the interior surface of the hollow body, said resin feed-head means being located a selected distance from the discharge end of said mandrel, conduit means extending axially through said mandrel and connected to said feedhead means for supplying resin thereto, and means associated with said hollow body at a location downstream of said feed-head means for accelerating the curing of the inner resin layer.

9. An apparatus according to claim 2, including means defining a heating zone disposed adjacent the mandrel to at least partially cure and harden the resin applied to said fibres, a resin distributor head means located a selected distance from the discharge end of said mandrel for applying a layer of resin to the interior surface of the hollow body, and a heat-insulated conduit means connected to said distributor head means for supplying resin thereto, said conduit means extending axially through the interior of said mandrel and through a heating zone defined by said heating means.

* * * * *